United States Patent
Zhou

(10) Patent No.: US 6,461,659 B1
(45) Date of Patent: Oct. 8, 2002

(54) NON-HYDROSCOPIC SWEETENER COMPOSITION AND METHOD FOR PREPARATION OF SAME

(76) Inventor: James H. Zhou, 32 Hallmark Hill Dr., Wallingford, CT (US) 06492

( * ) Notice: Subject to any disclaimer, the term of this patent is extended or adjusted under 35 U.S.C. 154(b) by 0 days.

(21) Appl. No.: 09/439,208

(22) Filed: Nov. 12, 1999

(51) Int. Cl.7 .............................................. A23L 1/236
(52) U.S. Cl. ...................................... 426/548; 426/103
(58) Field of Search .............................. 127/29, 30, 60, 127/63; 426/548, 555, 658, 443, 453, 456, 96, 103; 435/72, 100

(56) References Cited

U.S. PATENT DOCUMENTS 5,433,965 A * 7/1995 Fischer et al. .............. 426/548

FOREIGN PATENT DOCUMENTS

JP  10-304829  * 11/1998

\* cited by examiner

*Primary Examiner*—Keith Hendricks
(74) *Attorney, Agent, or Firm*—Bachman & LaPointe, P.C.

(57) ABSTRACT

A particulate sweetener composition includes a terpene glycoside component; a sugar alcohol component; and a terpene glycoside carrier component, wherein the composition is non-hydroscopic. The preferred carrier is fructose. A method is also provided for making the composition.

16 Claims, No Drawings

NON-HYDROSCOPIC SWEETENER COMPOSITION AND METHOD FOR PREPARATION OF SAME

CROSS REFERENCE TO DISCLOSURE DOCUMENT

This application is related to disclosure document No. 462570 filed Sep. 23, 1999.

BACKGROUND OF THE INVENTION

The invention relates to a sweetener composition and, more particularly, to a non-hydroscopic free-flowing particulate sweetener composition which is low caloric, low glycemic and dentally safe, and to a method for preparation of same.

Terpene glycosides from cucurbitaceae and rubus have been desirable in the food and health industries because of their intense sweet flavor combined with non-caloric and low glycemic properties.

In dry form, such terpene glycosides have a light dusty powder characteristic, and are extremely hydroscopic, i.e., they attract water and tend to rapidly clump which is undesirable.

In addition, terpene glycosides have an after taste which can be difficult to adjust for so as to provide a suitable sweetener having a desired clean sweet taste profile.

An additional problem has been that the hydroscopic terpene glycoside powders are very difficult to blend with other compositions, particularly with non-hydroscopic ingredients.

It is clear that the need remains for a sweetener composition which takes advantage of the flavor benefits of terpene glycosides without the problems associated with its hydroscopic nature. The need further remains for a sweetener composition utilizing terpene glycosides which has a clean and sweet taste profile.

It is therefore the primary object of the present invention to provide a sweetener composition which is essentially non-hydroscopic.

It is a further object of the present invention to provide a sweetener composition which has an excellent taste profile with no after taste.

It is a still further object of the present invention to provide a method for producing a dry sweetener composition containing terpene glycosides.

Other objects and advantages will appear hereinbelow.

SUMMARY OF THE INVENTION

In accordance with the present invention, the foregoing objects and advantages have been readily attained.

According to the invention, a particulate sweetener composition is provided which comprises a terpene glycoside component; a sugar alcohol component; and a terpene glycoside carrier component, wherein the composition is non-hydroscopic.

In further accordance with the invention, a method for making a sweetener composition has been provided, which method comprises the steps of providing a particulate terpene glycoside component; providing a terpene glycoside carrier component; coating the carrier component with the particulate terpene glycoside component so as to provide sub-particles of said fructose component coated with said terpene glycoside component; providing a particulate sugar alcohol component; mixing the sub-particles with the particulate sugar alcohol component in a humid environment so as to provide wet particles containing the terpene glycoside component, the carrier component and the sugar alcohol component; and drying the wet particles so as to provide a dry particulate sweetener composition.

DETAILED DESCRIPTION

The invention relates to a sweetener composition and, more particularly, to a non-hydroscopic particulate sweetener composition containing terpene glycosides which has an excellent sweet taste profile and which is low caloric and low glycemic.

In accordance with the invention, the sweetener composition includes a terpene glycoside component, a sugar alcohol component and a terpene glycoside carrier component which is preferably fructose. While the terpene glycoside component and fructose component are both hydroscopic in nature, the sugar alcohol component is advantageously non-hydroscopic and the final sweetener composition is non-hydroscopic.

As used herein, the term hydroscopic relates to a quality or nature of a material wherein the material attracts water. Conversely, a product which is non-hydroscopic does not tend to attract water. This characteristic may best be measured by measuring flowability of a composition after exposure to moisture or water source. In accordance with the present invention and disclosure, a product will be considered to be non-hydroscopic if, after being exposed to humidity of about 80% for a period of about 168 hours and a temperature 70–80° F., at least about 80% wt. of the composition remains free flowing and non-clumping when passed through a 20 mesh screen. In this regard, it is preferred to obtain a flow rate of 95% wt. under such circumstances.

Fructose is an advantageous sweetener suitable for diabetic use, but is not satisfactory for diet use due to its high caloric content (4 Calories/g). Fructose has a mean particle size range of 0.35–0.55 mm that makes it easy to flow, but hydroscopicity makes it clump when stored.

Erythritol is a sugar alcohol which is low glycemic, has a clean taste, and is low caloric (0.2 calorie/g) but has a low sweet intensity. Crystalline erythritol has a particle size of typically between about 0.2 and about 0.5 mm and in some cases greater than or equal to 1 mm which makes it difficult to blend with fine hydroscopic powders. Erythritol is also available in powder form having a much smaller particle size preferably less than or equal to about 0.2 mm. Erythritol crystals can be ground to a powder which is non-hydroscopic, but the powder easily clumps due to molecular crystalline forces or forces of attraction.

The terpene glycoside component of the sweetener composition of the present invention is advantageously naturally occurring terpene glycosides which can be extracted from members of the cucurbitaceae family and the rubus family. Particularly preferred terpene glycosides include triterpene glycoside extract from the cucurbitaceae family, preferably from Siraitia grosvenori which produces a kiwi-like fruit, and diterpene glycosides from the rubus family, preferably rubus suavissimus. Terpene glycosides from other botanical families are useful as well, such as those from stevia.

Particularly preferred terpene glycosides are mogroside, rubusoside and stevioside. Most preferable terpene glycosides include mogroside IV, mogroside V and siamenoside I, which are preferably obtained from the genus/species S. grovenorii, S. siamensis, S. silomaradiae, S. sikkimensis, S.

africana, S. borneensis and S. taiwaniana. The preferred rubusosides are preferably obtained from the genus/species rubus suavissimus, blackberry, kiwi, raspberry, blueberry and genus/species of the rubus family. Preferred steviosides are those obtained from stevia rebaudiana.

The sugar alcohol component is preferably a non-hydroscopic sugar alcohol which is particulate in form at room temperature. The preferred sugar alcohol is erythritol which is a tetrahydric alcohol which occurs naturally and can also be made synthetically. Erythritol presents in fruits such as kiwi, pear, grape and melon, as well as in fruit of the cucurbitaceae family. Erythritol can also be derived from corn dextrose and other similar sources. Additional non-hydroscopic sugar alcohols and anti-caking non-nutritive agents which are suitable for use in accordance with the present invention include isomalt, lactitol, xylitol, palatinit, maltitol, mannitol, sorbitol, silicon dioxide, calcium silicate, gum, cellulose, and the like.

Erythritol is preferably used in powder form having a particle size of less than or equal to about 0.2 mm. Particle sizes larger than 0.2 mm can be difficult to mix with terpene glycoside and fructose according to the invention. Alternatively, erythritol crystals can be used as a source of erythritol. However, crystals have a particle size of between about 0.2 mm and about 0.5 mm and must be ground down to a particle size of less than or equal to about 0.2 mm.

The carrier component can be fructose obtained from any available source as would be readily known to a person of ordinary skill in the art. Fructose is a desirable carrier because its particle size, between about 0.35 mm and about 0.55 mm, is ideal for combining according to the invention, and also because of the desirable flavor characteristics. Other suitable carriers include sucrose; mixtures of fructose with dextrose, maltose, glucose and/or sucrose; polyols and other fruit concentrates.

In accordance with the present invention, it has advantageously been found that by utilizing a particular process and interaction of ingredients to manufacture the sweetener composition of the present invention, the final dry product can be provided containing the desired components and flavor and having non-hydroscopic properties. In accordance with the invention, the particulate terpene glycoside is first mixed with the particulate carrier or fructose component. This results in a coating of the fructose component with the terpene glycoside powder so as to provide sub-particles of terpene glycoside-coated fructose. These sub-particles are then mixed with the non-hydroscopic particulate sugar alcohol component, and exposed to water either through spraying or spreading, or exposure to a humid environment, so that the mixture absorbs moisture and forms wet particles containing the sub-particles of terpene glycosides-coated fructose and sugar alcohol.

These wet particles are then dried so as to provide the desired particulate sweetener composition of the present invention, and this composition has been found, advantageously, to be essentially non-hydroscopic in behavior.

The composition of the present invention is preferably prepared so as to provide the final composition with a terpene glycoside composition of between about 1% wt. and about 30% wt., more preferably between about 2% wt. and about 15% wt. and ideally between bout 3% wt. and about 10% wt.; a sugar alcohol composition in an amount between about 5% wt. and about 95% wt., more preferably between about 20% wt. and about 90% wt. and ideally between about 80% wt. and about 90% wt.; and a fructose composition in an amount between about 0.5% wt. and about 27% wt., more preferably between about 2% wt. and about 15% wt. and ideally between about 3% wt. and about 15% wt.

The final composition of the present invention is preferably prepared so as to have an average particle size of between about 0.1 mm and about 1 mm. The starting ingredients are preferably provided so as to have particulate sugar alcohol powder having a particle size of less than or equal to about 0.2 mm and so as to have carrier or fructose particles having a particle size of between about 0.35 mm and about 0.55 mm.

In connection with the sugar alcohol component, specifically the preferred erythritol composition, it should be noted that a composition can be prepared in accordance with the present invention using either erythritol powder having an average particle size of less than or equal to about 0.2 mm, or using ground erythritol crystals which are ground to powder form having an average particle size of less than or equal to about 0.2 mm.

In addition, although additional mixing is required, and additional anti-caking materials may be required, a relatively non-hydroscopic sweetener can be prepared using only erythritol powder mixed with terpene glycoside in accordance with the present invention. In this case, substantial mixing or grinding is necessary to obtain a good mixture. This can be done during grinding of erythritol crystals down to the desired size, or separately starting with erythritol powder. The results are not as advantageous as those obtained using the fructose component, however, since the composition without fructose still tends somewhat to clump and additional grinding and/or mixing results in additional cost. Nevertheless, such a composition can be provided in accordance with the broad scope of the present invention.

As set forth above, the sub-particles of terpene glycoside-coated fructose carrier are mixed with the particulate sugar alcohol, and exposed to a water source. In one embodiment of the present invention, the mixture of particles is exposed to water source by spreading and spraying with water in an amount of between about 0.25% and about 3% by wt. of the particulate product so that the mixture absorbs moisture and forms wet particles containing the desired three components of the present invention.

Alternatively, the blend of sub-particles and sugar alcohol particles can be exposed to a humid environment, for example having a humidity of between about 85% and about 100%, for between about 5–30 minutes and up to as much as at least about 7 days so as to allow the particles to absorb sufficient moisture and form the desired wet particles containing all three components.

The wet particles are then dried so as to provide the final particulate sweetener composition as desired. The wet particles or moisturized blend are preferably heated to a temperature of between about 37° C. and about 50° C. so as to speed the drying process. In either moisture exposure embodiment, the drying step is preferably carried out so as to provide final dry product having a water content of less than or equal to about 1% wt.

In some applications, it may be desirable to add additional anti-caking agents to the composition. Suitable anti-caking agents include silicon dioxide, calcium silicate, cellulose and other compositions which are know to the person of ordinary skill in the art to decrease caking.

This additional additive can be included so as to provide even further non-hydroscopic characteristics in the final composition, or, if desired, to allow a decrease in the amount of sugar alcohol component to be used in particular applications.

The final sweetener composition of the present invention includes intensely sweet but hydroscopic terpene glycoside, low caloric and non-hydroscopic erythritol which has a clean sweet flavor approximately 70% as sweet as sucrose, and low glycemic and hydroscopic fructose as a carrier. Each of these components possesses disadvantages separately. Specifically, erythritol can free flow in crystal form but often forms cakes in powder form due to its molecular crystal forces. Terpene glycoside is intensely sweet, but is dusty and hydroscopic and has an after taste. Fructose is both hydroscopic and high caloric.

However, in the final composition, the combination of terpene glycoside and erythritol overcomes the after taste and hydroscopic characteristics of the terpene glycoside, and the powder erythritol binds with the terpene glycoside powder to eliminate the dusty characteristics of terpene glycoside. Further, the fructose component, by carrying terpene glycoside, mediates a complete blending between the terpene glycoside powder and erythritol powder while prohibiting the caking which would normally accompany erythritol. Further, the fructose also helps to mediate the after taste of terpene glycoside, yet is present in sufficiently small amounts so as to significantly impact on the low-caloric nature of the composition. The final product is therefore a non-caking and non-hydroscopic sweetener composition which is advantageously low caloric and low glycemic and can therefore readily be utilized in a wide variety of sweetener applications. The product avoids the factors which generally cause concerns from a dental standpoint. Further, the flavor profile is substantially free of any after taste.

The following examples demonstrate the successful process of the present invention for preparing various different blends of components in accordance with the present invention.

EXAMPLE 1

The following list provides an example of seven particulate products which were prepared in accordance with the process of the present invention and which are suitably non-hydroscopic while providing an excellent and clean sweet flavor profile.

| Product 1 | |
|---|---|
| Mogroside (80%k triterpene glycoside from extract of Lou Han Fruit in Curcubitaceae botanical family) | 2.9 g |
| Fructose | 7.1 g |
| Erythritol | 90 g |
| Product 2 | |
| Mogroside (80%k triterpene glycoside from extract of Lou Han Fruit in Cucurbitaceae botanical family) | 5.8 g |
| Fructose | 4.2 g |
| Erythritol | 90 g |
| Product 3 | |
| Mogroside (80%k triterpene glycoside from extract of Lou Han Fruit in Cucurbitaceae botanical family) | 8.2 g |
| Fructose | 6.8 g |
| Erythritol | 85 g |
| Product 4 | |
| Mogroside (80%k triterpene glycoside from extract of Lou Han Fruit in Cucurbitaceae botanical family) | 2.7 g |
| Rubusoside (80% diterpene glycoside from extract Blackberry, Rubus botanical family) | 5.5 g |
| Fructose | 6.8 g |
| Erythritol | 85 g |
| Product 5 | |
| Mogroside (80%k triterpene glycoside from extract of Lou Han Fruit in Cucurbitaceae botanical family) | 2.7 g |
| Rubusoside (80% diterpene glycoside from extract Blackberry, Rubus botanical family) | 5.5 g |
| Fructose | 21.8 g |
| Erythritol | 70 g |
| Product 6 | |
| Rubusoside (80% diterpene glycoside from extract Blackberry, Rubus botanical family) | 8.2 g |
| Fructose | 21.8 g |
| Erythritol | 70 g |
| Product 7 | |
| Mogroside (80% triterpene glycoside from extract of Lou Han Fruit in Cucurbitaceae botanical family) | 10 g |
| Rubusoside (80% diterpene glycoside from extract Blackberry, Rubus botanical family) | 15 g |
| Fructose | 25 g |
| Erythritol | 50 g |
| Product 8 | |
| Mogroside (80% triterpene glycoside from extract of Lou Han Fruit in Cucurbitaceae botanical family) | 2.7 g |
| Rubusoside (80% diterpene glycoside from extract Blackberry, Rubus botanical family) | 5.5 g |
| Fructose | 70.0 g |
| Erythritol | 20.0 g |
| Cellulose | 1.8 g |

EXAMPLE 2

2.9 g of fine mogroside powder from extract of cucurbitaceae fruit containing 80% triterpene glycoside were mixed with 7.1g of crystalline fructose in a laboratory mixer. They were mixed thoroughly to allow the fructose grains to be coated with mogroside. The glycoside-coated fructose grains were then blended with 90 g of erythritol powder in the same mixer. The mixture was placed in an incubator with 90% humidity at 40° C. for 30 minutes to allow the mixture to absorb sufficient moisture and form particles. These particles were then dried to provide a final moisture content in the product of less than about 1% wt. The final product was non-hydroscopic and had an excellent sweet-flavor profile.

EXAMPLE 3

0.4 kg of cucurbitaceae fruit extract (80% triterpene glycoside) and 0.8 kg of Chinese blackberry extract (80% diterpene glycoside) were mixed with 1kg of crystalline fructose and blended in a 33 barrel manufacturing blender with a nozzle sprayer. These were mixed until the crystalline fructose was coated with triterpene and diterpene glycosides, and 13 kg of erythritol powder were then added to the blender. The mixture was moisturized using the nozzle sprayer by adding 0.075 kg of water while mixing. The mixture was heated using an electric hot band for about 30 minutes to a temperature of about 20° C. while mixing. The mixture was dried and then sieved on a 20 mesh screen to remove particles which were too large. The resulting product contained approximately 8% wt. terpene glycoside, 85% wt. erythritol and 6.6% wt. fructose, and less than 1% moisture.

EXAMPLE 4

1.2 kg of cucurbitaceae fruit extract (80% triterpene glycoside) were mixed with 0.32 kg crystalline fructose and blended in a 33 barrel manufacturing blender for 10 minutes until the triterpene glycoside coated the crystalline fructose particles. 13.5 kg of erythritol powder were then added to the blender and mixed, with heating from an electric hot band for about 30 to about 40° C. during mixing. The mixture was dried and then sieved on a 20 mesh screen to remove large particles, and the resulting product contained about 8% wt. of terpene glycoside, about 90% wt. of erythritol and about 2% wt. fructose with a moisture content of less than about 1% wt.

EXAMPLE 5

In this example, a simple blending was used without heated drying. 1.2 kg of cucurbitaceae fruit extract (80% triterpene glycoside) was mixed with 1.2 kg of crystalline fructose and blended for 10 minutes in a 33 barrel manufacturing blender to provide triterpene glycoside-coated fructose particles. 12.6 kg of erythritol powder were added and blended in the blender for 20 minutes. Following a suitable drying period, the resulting product contained approximately 8% terpene glycosides, 84% erythritol and 8% fructose with a moisture content of less than 1%.

EXAMPLE 6

In this example, a cross section of different compositions having various contents of terpene glycoside, fructose, and erythritol powder were prepared and passed through a 20 mesh screen after exposure to 85% humidity at a temperature of 70° F. for a period of 7 days. Following this exposure, the compositions were passed through the 20 mesh screen and flow rate was measured so as to determine the flowability, and therefore the non-hydroscopicity of the product.

The various compositions tested and resulting flow rate are set forth below in Table 1.

|  | A | B | C | D | E | F | G | H | I | J | K | L |
|---|---|---|---|---|---|---|---|---|---|---|---|---|
| TERPENE GLYCOSIDE wt % | 100 | 5.8 | 5.8 | 5.8 | 5.8 | 5.8 | 5.8 | 5.8 | 5.8 | 5.8 | 5.8 | 5.8 |
| FRUCTOSE wt % | 0 | 94.2 | 84.2 | 74.2 | 64.2 | 54.2 | 44.2 | 24.2 | 14.2 | 9.2 | 4.2 | 0 |
| ERYTHRITOL wt % (POWDER) | 0 | 0 | 10 | 20 | 30 | 40 | 50 | 70 | 80 | 85 | 90 | 94.2 |
| FLOW RATE wt % | 0 | 0 | 5 | 50 | 60 | 65 | 70 | 75 | 80 | 95 | 96 | 45* |

As set forth above, a zero flow rate was obtained for pure terpene glycoside (composition A). Also as shown in Table 1, compositions B and C containing primarily fructose with small compositions of terpene glycoside and, in the case of composition C, a small composition of erythritol, had 0% and 5% flow rate respectively. This is indicative of unacceptably hydroscopic product which clumps and cannot flow.

Composition L of Table 1, which contained mostly erythritol and no fructose, had a flow rate of only 45%. This was due to caking due to molecular force of attraction of the erythritol powder as opposed to hydroscopic properties, but nevertheless results in an unacceptably clumping product.

Compositions D–K all show varying improvements of flow rate as compared to compositions containing primarily terpene glycoside, fructose or erythritol alone. Particularly advantageous results are obtained with compositions I, J and K, especially J and K wherein flow rates of 95% wt. and 96% wt. are obtained. Clearly, the particular composition and method of the present invention is advantageous in providing a non-clumping, non-hydroscopic and free-flowing particulate sweetener composition.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed:

1. A method for making a particulate sweetener composition, comprising the steps of:

providing a particulate terpene glycoside component;

providing a particulate terpene glycoside carrier component having a particle size of between about 0.35 mm and about 0.55 mm;

coating the carrier component with the particulate terpene glycoside component so as to provide sub-particles of said carrier component coated with said terpene glycoside component;

providing a particulate sugar alcohol component;

mixing the sub-particles with the particulate sugar alcohol component in a humid environment so as to provide wet particles containing the terpene glycoside component, the carrier component and the sugar alcohol component; and drying the wet particles so as to provide a dry particulate sweetener composition, wherein the composition comprises particles formed of the sugar alcohol component and sub-particles of the carrier component coated with the terpene glycoside component.

2. The method according to claim 1, wherein the carrier component is fructose.

3. The method according to claim 1, wherein the mixing step comprises mixing the sub-particles with the particulate sugar alcohol component to provide a blend, and exposing the blend to water in an amount between about 0.25% and about 3% wt. based on weight of the blend to provide the wet particles.

4. The method according to claim 3, wherein the drying step reduces a water content of the dry particulate sweetener composition to less than or equal to about 1.0% wt.

5. The method according to claim 1, wherein the mixing step comprises mixing the sub-particles with the particulate sugar alcohol to provide a blend, and exposing the blend to a humid environment having a humidity of between about 85% and about 100% for a period of time sufficient to provide the wet particles.

6. The method according to claim 5, wherein the drying step reduces a water content of the dry particulate sweetener composition to less than or equal to about 1% wt.

7. The method according to claim 1, wherein the drying step is carried out at a temperature of between about 37° C. and about 50° C.

8. The method according to claim 1, wherein the sugar alcohol component is selected from the group consisting of sugar alcohol derived from pear, grape, melon, kiwi fruit, cucurbitaceae fruit, corn dextrose and mixtures thereof.

9. The method according to claim 1, wherein the sugar alcohol component is erythritol.

10. The method according to claim 1, wherein the composition contains the terpene glycoside component in an amount between about 1% wt. and about 30% wt.; the sugar alcohol component in an amount between about 5% wt. and about 95% wt.; and the carrier component is fructose in an amount between about 0.5% wt. and about 27% wt.

11. The method according to claim 1, wherein the composition contains the terpene glycoside component in an amount between about 2% wt. and about 15% wt.; the sugar alcohol component in an amount between about 20% wt. and about 90% wt. and the carrier component is fructose in an amount between about 2% wt. and about 15% wt.

12. The method according to claim 1, wherein the composition contains the terpene glycoside component in an amount between about 3% wt. and about 10% wt.; the sugar alcohol component in an amount between about 80% wt. and about 90% wt.; and the carrier component is fructose in an amount between about 3% wt. and about 15% wt.

13. The method according to claim 1, wherein the sugar alcohol component is non-hydroscopic.

14. The method according to claim 1, wherein the terpene glycoside component is selected from the group consisting of mogroside IV, mogroside V, siamenoside I and mixtures thereof.

15. The method according to claim 1, wherein the dry particulate sweetener composition has a particle size of between about 0.1 mm and about 1 mm.

16. The method according to claim 1, wherein the sugar alcohol component is erythritol powder having a particle size of less than or equal to about 0.2 µm.

* * * * *